(12) United States Patent
Liu (10) Patent No.: US 10,788,313 B2
(45) Date of Patent: Sep. 29, 2020

(54) METHOD FOR DETERMINING A POSITION OF AN ITEM, ITEM MONITORING SYSTEM AND NON-TRANSITORY COMPUTER-READABLE RECORDING MEDIUM

(71) Applicant: BEIJING KUANGSHI TECHNOLOGY CO., LTD., Beijing (CN)

(72) Inventor: Danqing Liu, Beijing (CN)

(73) Assignee: BEIJING KUANGSHI TECHNOLOGY CO., LTD., Beijing (CN)

( * ) Notice: Subject to any disclaimer, the term of this patent is extended or adjusted under 35 U.S.C. 154(b) by 71 days.

(21) Appl. No.: 16/209,415

(22) Filed: Dec. 4, 2018

(65) Prior Publication Data
US 2019/0346255 A1 Nov. 14, 2019

(30) Foreign Application Priority Data
May 11, 2018 (CN) .......................... 2018 1 0453740

(51) Int. Cl.
G01B 11/02 (2006.01)
G01B 11/22 (2006.01)
G01B 11/25 (2006.01)

(52) U.S. Cl.
CPC ............ *G01B 11/026* (2013.01); *G01B 11/22* (2013.01); *G01B 11/2522* (2013.01)

(58) Field of Classification Search
CPC ... G01B 11/2522; G01B 11/22; G01B 11/026; G01S 17/89; G01S 17/88; G01S 7/4802; G01S 17/42; G06Q 10/08
See application file for complete search history.

(56) References Cited

U.S. PATENT DOCUMENTS 4,979,815 A * 12/1990 Tsikos ................ G01B 11/2522
356/2
6,780,213 B2 8/2004 Chang et al.
(Continued)

FOREIGN PATENT DOCUMENTS

CN 105245828 A 1/2016
CN 106897670 A 6/2017
(Continued)

OTHER PUBLICATIONS

Extended European Search Report (EESR) for Application No. 18210944.7, dated Feb. 12, 2019.
(Continued)

*Primary Examiner* — Sang H Nguyen
(74) *Attorney, Agent, or Firm* — Marshall, Gerstein & Borun LLP (57) ABSTRACT

There are provided in the present disclosure a method for determining a position of an item, an item monitoring system and a non-transitory computer-readable recording medium, and relates to the technical field of intelligent monitoring. The method is applied to a processing device connected to a depth sensor installed on a rack, the rack is located in a sensing space of the depth sensor, the rack is provided with a plurality of feature components, and each kind of item on the rack is placed corresponding to a feature component, the method comprises: acquiring depth information and light intensity information collected by the depth sensor; determining position information of each feature component according to the light intensity information and the depth information; determining the position information of an item placed corresponding to each feature component according to the position information of each feature component.

18 Claims, 5 Drawing Sheets

(56) References Cited

U.S. PATENT DOCUMENTS

| | | | |
|---|---|---|---|
| 6,847,859 B2* | 1/2005 | Nuebling | G01B 11/04 |
| | | | 198/502.2 |
| 7,602,505 B2* | 10/2009 | Kaltenbach | G01B 11/00 |
| | | | 356/601 |
| 9,478,030 B1* | 10/2016 | Lecky | G06K 9/4604 |
| 9,694,498 B2* | 7/2017 | Konolige | G06T 7/593 |
| 9,827,683 B1* | 11/2017 | Hance | G06K 19/06037 |
| 9,908,696 B1* | 3/2018 | Zevenbergen | B65G 1/0492 |
| 2002/0040971 A1* | 4/2002 | Ono | G01S 17/08 |
| | | | 250/559.38 |
| 2010/0060453 A1 | 3/2010 | Kushida et al. | |
| 2015/0354949 A1* | 12/2015 | Lecky | G06F 3/017 |
| | | | 702/150 |
| 2016/0162179 A1* | 6/2016 | Annett | G06F 3/0488 |
| | | | 715/709 |
| 2016/0373734 A1 | 12/2016 | Cole et al. | |
| 2016/0379061 A1 | 12/2016 | Zhang et al. | |
| 2017/0011524 A1 | 1/2017 | Shpunt et al. | |
| 2017/0214902 A1* | 7/2017 | Braune | H04N 13/239 |
| 2017/0286901 A1* | 10/2017 | Skaff | G06K 9/4642 |
| 2018/0309974 A1* | 10/2018 | Varekamp | G06T 7/50 |

FOREIGN PATENT DOCUMENTS

| | | |
|---|---|---|
| CN | 107403332 A | 11/2017 |
| JP | 2001304821 A | 10/2001 |
| JP | 2004198129 A | 7/2004 |
| JP | 2005083984 A | 3/2005 |
| JP | 2005138957 A | 6/2005 |
| JP | 2010058908 A | 3/2010 |
| JP | 2015203596 A | 11/2015 |
| KR | 20020024249 A | 3/2002 |
| WO | WO-2017172782 A1 | 10/2017 |

OTHER PUBLICATIONS

Fachhochschule Stuttgart, "Implementation of a Low Cost Maker Based Infrared Optical Tracking System", Jan. 1, 2016, pp. 1-101, Retrieved from the Internet on Jan. 30, 2019: URL:https://publik.tuwien.ac.at/files/PubDat 210294.pdf.

First Office Action issued by the Chinese Patent Office in the corresponding Chinese application No. 201810453740.9, dated Apr. 15, 2020 with an English translation.

First Office Action issued by the Korean Patent Office in the corresponding Korean application No. 10-2018-0152425, dated May 28, 2020 with an English translation.

Notice of Allowance issued by the Japanese Patent Office in the corresponding Japanese application No. 2018-229735, dated Jun. 9, 2020, with an English translation.

\* cited by examiner

METHOD FOR DETERMINING A POSITION OF AN ITEM, ITEM MONITORING SYSTEM AND NON-TRANSITORY COMPUTER-READABLE RECORDING MEDIUM

CROSS-REFERENCE TO RELATED APPLICATION

The present application claims the priority of Chinese patent application No. 201810453740.9 filed on May 11, 2018, the disclosure of which is incorporated herein by reference in its entirety.

TECHNICAL FIELD

The present disclosure relates to a technical field of intelligent monitoring, in particular to a method for determining a position of an item, an item monitoring system and a non-transitory computer-readable recording medium.

BACKGROUND

Racks are used in a wide range of industries, for example, racks used in shopping malls, vertical cold air cabinets for drinks, glass display refrigerators for storing frozen products, bookshelves used in libraries or bookstores, and storage racks used in warehouses, etc., are all racks.

With the development of technology, intelligent racks equipped with monitoring equipment (such as an AI vision machine, a distance sensor, or a weighing sensor) have gradually emerged. Based on the knowledge of placement of various items on the racks, by using the monitoring equipment, such a rack can determine information about the amount change of the items placed on the rack, as well as information about what items on the rack are touched. When using a rack, a staff needs to pre-measure and calibrate an exact position of each item on the rack. However, the position of an item on the rack may deviate slightly, for example, a position of an item may deviate up or down due to the height of a shelf on the rack changes, or a position of an item may deviate left or right due to the sparse placement or close placement of items. Once the position of the item deviates, the monitoring result is inaccurate, and the staff needs to re-calibrate the position of the item, which is complicated and time consuming.

SUMMARY

There is provided a method, an apparatus, and a system for determining a position of an item, which can determine the position of the item on the rack automatically, and therefore, the complicated manual calibration can be omitted, and the labor cost can be saved.

The embodiment of the present disclosure provides a method for determining a position of an item, wherein the method is applied to a processing device, the processing device is connected to a depth sensor installed on a rack, the rack is located in a sensing space of the depth sensor, the rack is provided with a plurality of feature components, wherein the feature components have specific reflectance, or the feature components are light sources with specific wavelength, each kind of item on the rack is placed corresponding to a feature component, the method comprises: acquiring depth information and light intensity information collected by the depth sensor; determining position information of each feature component according to the light intensity information and the depth information; determining the position information of an item placed corresponding to each feature component according to the position information of each feature component.

The embodiment of the present disclosure further provides an apparatus for determining a position of an item, the apparatus is applied to a processing device, the processing device is connected to a depth sensor installed on a rack, the rack is located in a sensing space of the depth sensor, the rack is provided with a plurality of feature components, wherein the feature components have specific reflectance, or the feature components are light sources with specific wavelength, each kind of item on the rack is placed corresponding to a feature component, the apparatus comprises: information acquiring module, for acquiring depth information and light intensity information collected by the depth sensor; a first determination module, for determining position information of each feature component according to the light intensity information and the depth information; a second determination module, for determining the position information of an item placed corresponding to each feature component according to the position information of each feature component.

The embodiment of the present disclosure further provides an item monitoring system, the system comprising: a depth sensor; and a processing device, the depth sensor for collecting sensing information and light intensity information; the processing device stores computer programs, the computer programs, when being executed by the processing device, performs a method for determining a position of an item as stated above.

The embodiment of the present disclosure further provides a non-transitory computer readable recording medium, wherein computer programs are stored in the non-transitory computer readable recording medium, wherein the computer programs, when being executed by the processing device, performs a method for determining a position of an item as stated above.

The method, apparatus, and system for determining position of an item are provided according to embodiments of the present disclosure, the processing device is connected to a depth sensor installed on a rack, the rack is located in a sensing space of the depth sensor, the rack is provided with a plurality of feature components, each kind of item on the rack is placed according to a feature component. The processing device can determine position information of each feature component, and further determine position information of an item corresponding to each feature components according to position information of each feature component. In this manner, the position of the feature component can be determined first, the feature components has specific reflectance or is the light source with a specific wavelength, therefore, the position of the item corresponding to the feature component can be determined, and the cumbersome manual calibration is omitted and the cost of labor is saved.

Other features and advantages of the present disclosure will be set forth in the following description, or, a part of features and advantages can be inferred or apparently determined from the description, or can be learned by implementation of the disclosure.

In order to make the above described purposes, features, and advantages of the present disclosure more apparent, hereinafter, preferred embodiments, with reference to the accompanying drawings, will be described in detail.

BRIEF DESCRIPTION OF THE DRAWINGS

In order to more clearly illustrate the specific embodiments of the present disclosure or the technical solutions in the prior art, the drawings used in the specific embodiments or the description of the prior art will be briefly described below, and apparently, the drawings in the following description are some embodiments of the present disclosure, and those skilled in the art can obtain other drawings based on these drawings without any creative work.

DETAILED DESCRIPTION

In order to make the purposes, technical solutions, and advantages of the present disclosure more evident, exemplary embodiments according to the present disclosure will be described in detail by referring to the accompanying figures. Obviously, the embodiments described below are just a part of embodiments of the present disclosure, but not all the embodiments of the present disclosure, and it shall be understood that the present disclosure is not limited to the exemplary embodiments described herein. Based on the embodiments of the present disclosure described in the present disclosure, all the other embodiments obtained by those skilled in the art without paying any inventive labor shall fall into the protection scope of the present disclosure.

When a position of an item on a rack deviates, manual re-calibration is required, and the process is quite complicated. In order to solve the problem, a method, an apparatus, and a system for determining a position of an item are provided. The technology can be implemented by the corresponding software and hardware, and can be applied to any occasion where a position of an item on the rack needs to be known, such as intelligent retail scenes of various shopping places, intelligent library, and intelligent warehousing/logistics industry. etc. The embodiments of the present disclosure are described in detail below.

First, an exemplary electronic device 100 used for implementing a method, an apparatus, and a system for deterring a position of an item according to an embodiment of the present disclosure will be described by referring to FIG. 1.

Figure 1:
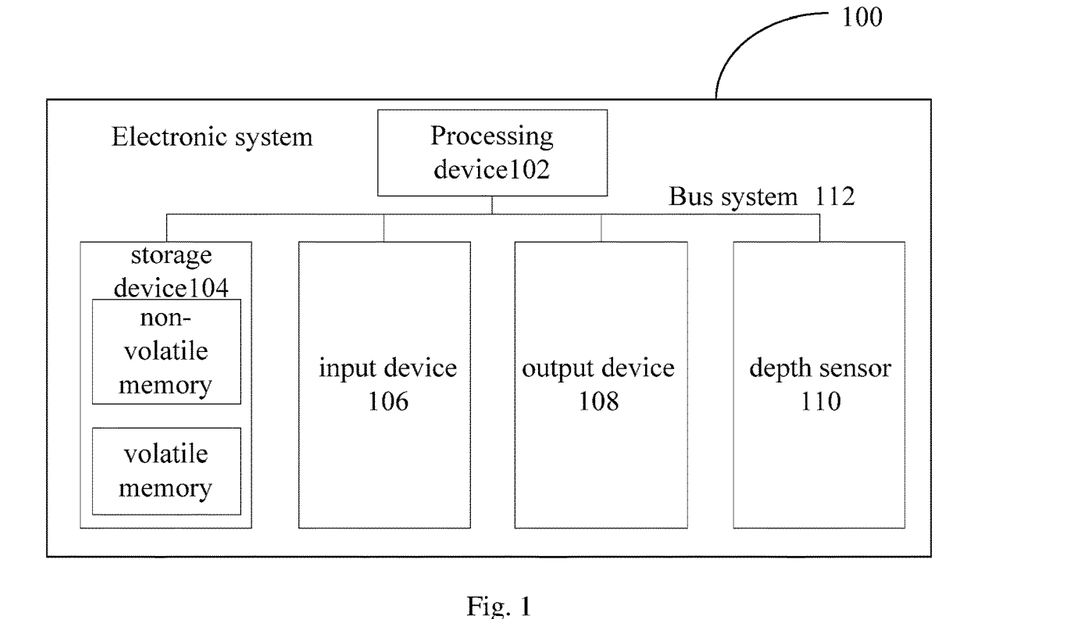
FIG. 1 shows a schematic block diagram of an exemplary electronic device according to an embodiment of the present disclosure.

As shown in FIG. 1, the electronic device 100 includes one or more processing devices 102, one or more storage devices 104, an input device 106, an output device 108 and multiple distance sensors 110. These components are connected to each other via a bus system 112 and/or a connection mechanism (not shown) in other forms. It shall be noted that components and structures of the electronic device 100 as shown in FIG. 1 are just for illustration but not for limitation. According to the requirements, the electronic device may have other components and structures.

The processing devices 102 can be a gateway, and also can be a device that includes a central processing unit (CPU) or other forms of processing units having data processing capability and/or instruction executing capability, and can process data in other components of the electronic device 100 and control other components in the electronic device 100 to execute desired functions.

The storage device 104 can include one or more computer program products, which can include various forms of computer readable storage medium, such as a volatile memory and/or a non-volatile memory. The volatile memory can include for example a random access memory (RAM) and/or a cache memory, etc. The non-volatile memory can include for example a read-only memory (ROM), a hardware, a flash memory, etc. One or more computer program instructions can be stored upon the computer readable storage medium, and the processing devices 102 can execute the program instructions to realize functions of a client and/or other desired functions (implemented by the processor) in the embodiment of the present disclosure described below. Various application programs and various data can be stored in the computer readable medium, for example various data used and/or produced by the application programs and so on and so forth.

The input device 106 can be a device used by a user to input instructions, and can include one or more of a keyboard, a cursor mouse, a microphone, and a touch screen or the like.

The output device 108 can output various information (for example, image or sound) to the outside (for example, a user), and can include one or more of a display, a speaker, or the like.

The depth sensor 110, such as a structured light sensor, an area array sensor, or a multi-line laser radar, can be a sensor that has at least one field of view, can sense a stereoscopic space, and transmit the sensed depth information to the processing device 102 or store the sensed depth information in the storage device 104 for being used by other components.

Exemplarily, various components in the exemplary electronic device used for implementing a method, an apparatus, and a system for determining a position of an item according to the embodiment of the present disclosure may be integrately or separately provided. For example, the processing device 102, the storage device 104, the input device 106, and the output device 108 are integrated, and the depth sensor is separately disposed at the top, bottom or edge side of an intelligent rack.

For ease of understanding, an application example of the electronic system of the present embodiment will be further described below. The electronic system can be installed and provided in a place where a rack is disposed, such as a supermarket, a library, a warehouse, etc., wherein a depth sensor can be disposed on the rack, and the sensing space of the depth sensor can be different depending on different installation positions of the depth sensor. The sensing space of the depth sensor can also be characterized by the field of view of the depth sensor. The rack is located within the field of view of the depth sensor. The rack with the above-mentioned electronic system can be called as an intelligent rack and can be flexibly applied to various occasions.

The present embodiment provides a method for determining a position of an item, for ease of understanding, an application scenario of the method is exemplified as follows.

The method is performed by a processing device that is coupled to a depth sensor installed on a rack. A position of an item may be determined according to the depth information and the light intensity information of the depth sensor.

The processing device of the present embodiment may be a gateway, and also be another device that has data processing capability, e.g., intelligent terminal, such as a computer. The processing device may independently process the received information, or may connect to a server, analyze and process the information together with the serve, and upload the processed result to a cloud.

The rack in the present embodiment may be any equipment capable of placing items, such as a shelf, a bookcase, a refrigerator, a cold air cabinet, etc. The structure and practical use of the rack are not limited in this embodiment. The item in this embodiment may also be referred to as a SKU (Stock Keeping Unit), which is a single item. For an item, when any of its attributes, such as brand, model, configuration, grade, color and pattern, package capacity, unit, and usage, is different from other items, it can be called as a single item.

A depth sensor in this embodiment may include, but are not limited to, a structural light depth sensor, an area array laser radar, or a multi-line mechanical scanning laser radar. The depth sensor may specifically be a multi-pixel depth distance sensor, on which millions of pixels (i.e., photosensitive elements) may be disposed, and performs multi-point sensing on a stereoscopic space (hereinafter referred to as a sensing space) to obtain depth information and light intensity information of each item in the sensing space. For example, the depth sensor is a depth sensor based on infrared sensing (i.e., an infrared depth sensor), which may collect the depth information and the infrared light intensity information in the sensing space. The infrared light intensity information may be infrared reflectance information obtained by reflecting the infrared light of the infrared depth sensor by a feature component having a specific reflectance in the sensing space, or may be emission intensity information emitted by an infrared light source as a feature component in the sensing space to the infrared depth sensor.

It can be understood that, the sensing space of the depth sensor is related to the installation position of the depth sensor. Different installation positions of the depth sensor correspond to different sensing spaces. In practical applications, the sensing space can be characterized by the field of view (FOV) in two directions, and the size of the field of view generally determines the field of view of the depth sensor. When applying the depth sensor to the rack, it is necessary to set the installation position of the depth sensor according to the actual situation, so that the field of view of the depth sensor in one direction can cover the front surface of the entire rack, and field of view in the other direction can cover the front space of the entire rack under the installation position, accordingly, the depth sensor can monitor the rack in the sensing space formed by the two field of view, and each item on the rack is located in the sensing space of the depth sensor.

Figure 2:
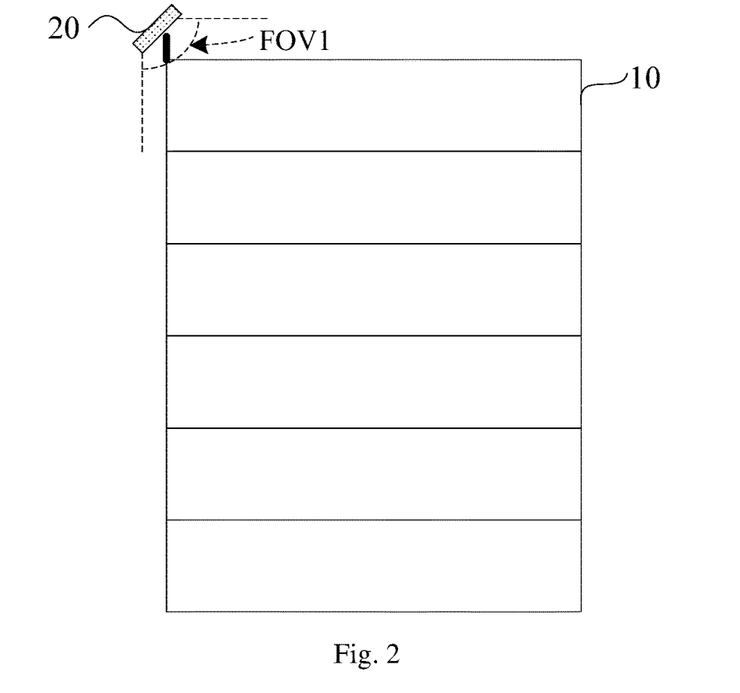
FIG. 2 shows a front elevational view showing the installation of a depth sensor on a rack according to an embodiment of the present disclosure.
Figure 3:
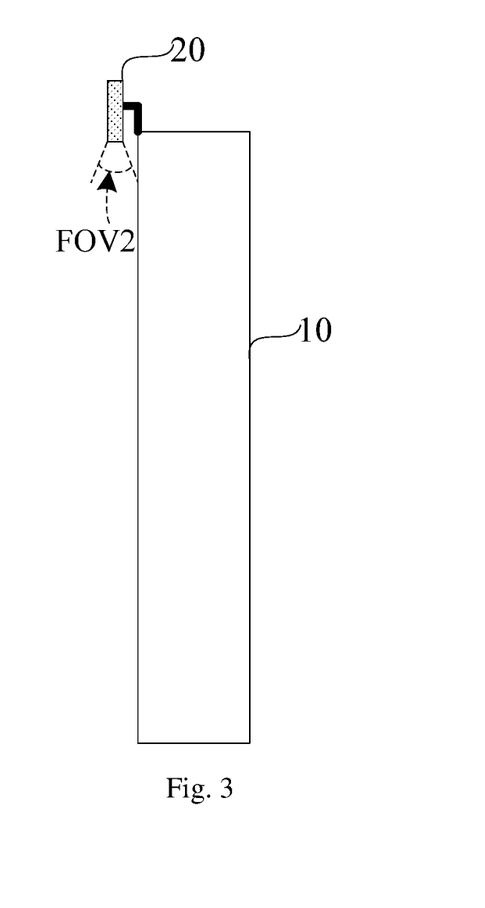
FIG. 3 shows a side view showing the installation of a depth sensor on a rack according to an embodiment of the present disclosure.

A front elevational view of installation of the depth sensor on the rack as shown in FIG. 2 and a side view of installation of the depth sensor on the rack as shown in FIG. 3 both show the rack 10 and the depth sensor 20. Specifically, FIG. 2 illustrates a field of view FOV1 of the depth sensor, and FOV1 is parallel to the front surface of the rack. In practical applications, the FOV1 may be about 90 degrees to cover the front surface of the entire rack. FIG. 3 indicates another field of view FOV2 of the depth sensor. In practical applications, the FOV2 can be greater than 20 degrees. For example, the FOV2 may be 30 degrees to cover the front space of the entire rack. The depth sensor can monitor the rack in the sensing space formed by FOV1 and FOV2, and collect depth information and light intensity information in the sensing space.

In addition, the rack according to the present embodiment may be provided with multiple feature components, which have specific reflection intensity or specific emission intensity. Specifically, the feature component may be made of a material having a specific reflectance with respect to the light source wavelength of the depth sensor (i.e., the wavelength of the built-in emitter of the depth sensor), or the feature component may be the light source with a wavelength consistent with that of the light source of the depth sensor. In practical applications, the specific reflectance may be higher than a first preset reflectance or lower than a second preset reflectance. That is, a higher reflectance or a lower reflectance is selected as the specific reflectance so that the depth sensor identifies the feature component based on the reflectance. Taking the depth sensor as an infrared sensor-based depth sensor as an example, the feature component having a specific reflection intensity may be a component made of a material with a reflectance higher than a first preset infrared reflectance, or a component made of a material with a reflectance lower than a second preset infrared reflectance, or an infrared light source with a wavelength that is consistent with the that of the light source of the depth sensor. That is, compared to other objects, the feature component has a special infrared reflectance (relatively high or relatively low), so that the depth sensor can identify the feature component by means of a special infrared reflectance when sensing an object in the sensing space. The above description is only an example. In practical applications, the depth sensor is not limited to an infrared sensor, that is, the wavelength of the light source of the depth sensor is not limited to the wavelength of the infrared light, and other wavelengths, such as the wavelength of the ultraviolet light, may also be selected according to actual needs.

The above-mentioned feature components may directly be a small partition provided on each shelf of the rack for separating different kinds of items, or may be an identification point or a light source fixedly disposed on the small partition. Taking a small partition as an example, a coating containing titanium dioxide (with a reflectance greater than 90%) may be applied to the leading edge of the small partition. Of course, a small partition may be not provide, instead, an infrared light source with the same wavelength as that of the light source of the depth sensor may be set on a shelf (also known as a compartment) of the rack, and each infrared light source is associated with an item, for example, an item is placed next to each of the infrared light sources. In addition, the feature component may also be a tag or an electronic tag correspondingly set for each item on the rack, a small back plate correspondingly set for each item in front of the shelf of the rack, and a hook for hanging items on the rack, etc. Regardless of the form or usage of a feature component, it is only required that the feature component is correspondingly set for the item, and is made of a material having a specific reflectance with respect to the wavelength of the light source of the depth sensor, or the feature component is a light source with a wavelength that is consistent with the wavelength of the light source of the depth sensor. The other usages of the feature component are not limited herein.

In practical applications, a feature component for identification may be individually set for each item, or a component having other usages, such as a partition, a tag/electronic tag, a back plate, a hook, etc., corresponding to each item may be directly used as the feature component. In a specific implementation, the partition, the tag/electronic tag, the back plate, the hook, etc., as the feature components on the rack, have specific reflection intensity; or, the light source having the wavelength consistent with that of the light source of the depth sensor is disposed at the partition, the tag/electronic tag, the back plate, and the hook, etc. that are corresponding to each item. The above description is only an example, and the actual forms, usages, and specific position setting manners of the feature components are not limited herein.

Figure 4:
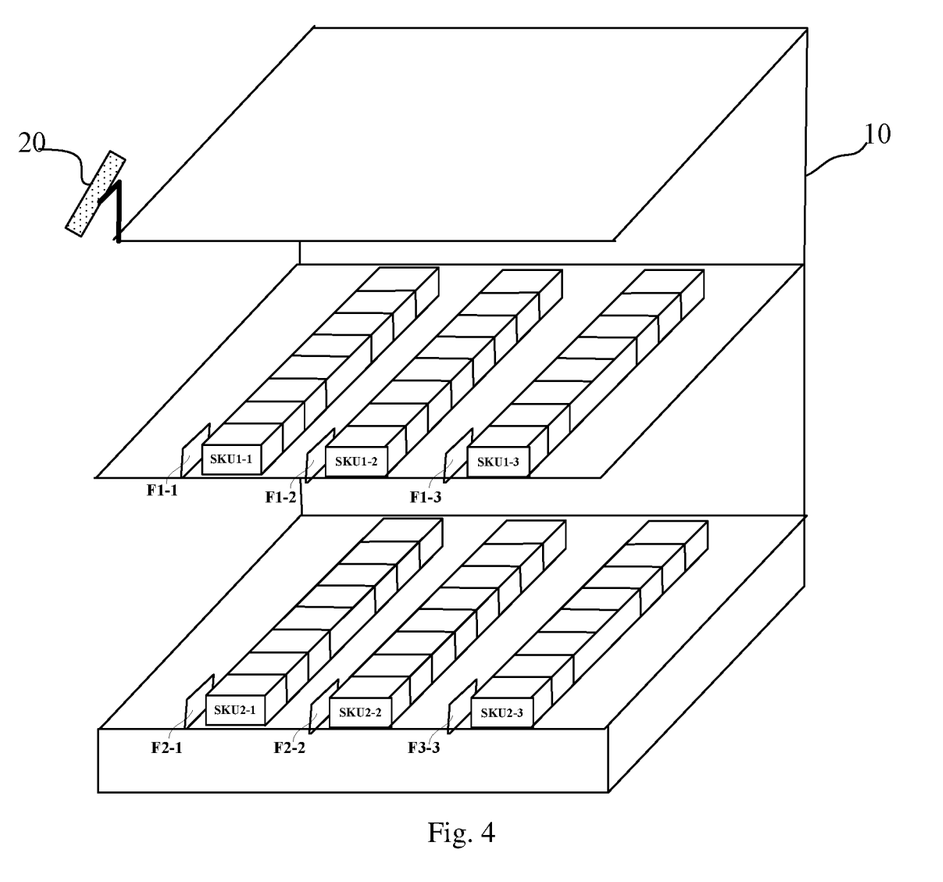
FIG. 4 shows an exemplary schematic diagram of a rack provided with a feature component according to an embodiment of the present disclosure.

For ease of understanding, taking the feature component is a small partition for separating two kinds of items as an example. Referring to FIG. 4, a structural diagram of a rack provided with a feature component is shown. FIG. 4 simply shows that the rack 10 is provided with two shelves, the first shelf of the rack is provided with three partitions (i.e., the aforementioned feature components), respectively referred to as F1-1, F1-2, and F1-3, and an item (SKU) is placed next to each feature component. Accordingly, the feature component F1-1 is considered to correspond to the SKU1-1, the feature component F1-2 corresponds to the SKU1-2, and the feature component F1-3 corresponds to the SKU1-3. Similarly, the second shelf on the rack is provided with three partitions, F2-1, F2-2 and F2-3, respectively; wherein the feature component F2-1 corresponds to SKU2-1, the feature component F2-2 corresponds to SKU2-2, and the feature component F2-3 corresponds to SKU2-3. It can be understood that, in practical applications, the first layer of the shelves may be deviated up or down due to the height adjustment performed by a staff, so that the height of the items placed on the shelf changes accordingly. The three items on the shelf and/or the three small partitions may also be displaced left or right due to the adjustment performed by the staff or the touch of the relevant person such as a consumer, and accordingly, the positions of the items are difficult to determine.

Figure 5:
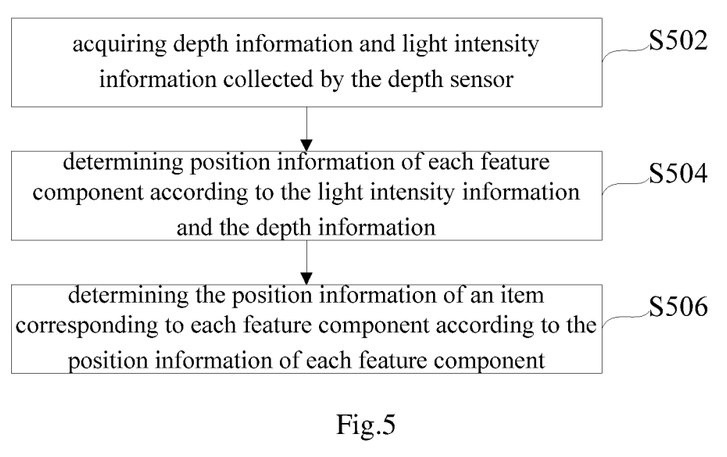
FIG. 5 shows a flowchart of a method for determining a position of an item according to an embodiment of the present disclosure.

Based on the above description, referring to a flowchart of a method for determining a position of an item as shown in FIG. 5, the method is applied to a processing device connected to a depth sensor installed on a rack, and the rack is located in a sensing space of the depth sensor. The rack is further provided with multiple feature components, and the feature components have a specific reflectance, or the feature components are light sources with a specific wavelength. Each item on the rack is placed correspondingly to a feature component. The method includes the following steps:

Step S502, acquiring depth information and light intensity information collected by the depth sensor.

In practical applications, a sensing map collected by the depth sensor may be first acquired; wherein the sensing map includes multiple pixels, each pixel corresponds to depth information and light intensity information output by a picture element of the depth sensor, and then the depth information and light intensity information corresponding to each pixel in the sensing map is extracted. Specifically, the above-mentioned sensing map may be referred to as a depth map, and the depth map may represent depth information and light intensity information corresponding to each pixel, and wherein the depth information may be understood as distance information.

In practical applications, the number of pixels of the multi-pixel depth sensor is equal to the number of pixels, and each pixel corresponds to one picture element. Assuming there are 1024 pixels in the row direction of the depth sensor and 768 pixels in the column direction of the depth sensor, accordingly, the depth sensor may also be called as a sensor with 1024×768 pixels, and a depth map of 1024×768 pixels may be obtained, with each pixel representative of the depth information and light intensity information output by a picture element.

At step S504, determining position information of each feature component according to the light intensity information and the depth information.

In an embodiment, the following steps may be performed:

(1) a target pixel is identified from the sensing map according to the light intensity information of each pixel. The light intensity information of the target pixel matches specific reflection intensity, or the light intensity information of the target pixel matches the specific emission intensity. The specific reflection intensity is related to a specific reflectance, and the specific emission intensity is related to a specific wavelength. It can be understood that, different items have different reflectances, and have different reflection intensities for the emitted light of the depth sensor. The reflection intensity can be sensed by the depth sensor and embodied in the pixel corresponding to the item in the sensing map. Accordingly, when the feature component has a specific reflectance, the specific reflection intensity presented by the pixels corresponding to the specific component in the sensing map of the depth sensor is related to the specific reflectance of the feature component. Similarly, when the feature component is a light source, the emitted light of the feature component is sensed by the depth sensor, and the specific emission intensity presented by the pixels corresponding to the specific component in the sensing map of the depth sensor is related to the wavelength of the emitted light of the feature component (i.e., the specific wavelength).

In the specific implementation, taking the depth sensor being an infrared depth sensor as an example, if the feature component is made of a material having a specific reflectance with respect to the infrared light wavelength emitted by the infrared depth sensor, as the infrared light reflectance of the feature component is special (relatively high or relatively low), the pixels corresponding to the feature component in the sensing map are extremely bright or extremely dark. Therefore, a target pixel matching the special infrared light reflection intensity (that is, the reflection intensity associated with the specific infrared reflectance) can be identified in the sensing map. If the feature component is a point light source with a wavelength that is consistent with that of the infrared light of the infrared depth sensor, the pixels corresponding to the point light source in the sensing map are extremely bright, and can be clearly distinguished from other pixels. Wherein, the target pixels are characterized by imaging information of the feature component.

In a specific implementation, a pixel having a difference between its light emission intensity and the specific reflection intensity within a first preset threshold range may be selected from the sensing map according to the light intensity information of each pixel, or a pixel having a difference between its emission intensity and the specific emission intensity within a second preset threshold range may be selected from the sensing map, then the selected pixels are determined as the target pixels. The first threshold range and the second threshold range may be the same or different, and may be flexibly set according to requirements. That is, if a difference between the light reflection intensity of a pixel and the specific reflection intensity is within the first preset threshold range, the light intensity information of the pixel is considered to match the specific reflection intensity, and the pixel is the target pixel; or, if a difference between the light emission intensity of a pixel and the specific emission intensity is within the second preset threshold range, the light intensity information of the pixel is considered to match the specific emission intensity, and the pixel is the target pixel.

(2) The position information of the feature component corresponding to the respective target pixels is determined based on the depth information of each target pixel. Specifically, the position information of the feature component corresponding to the target pixels may be determined according to the depth information of each target pixel and the pre-stored position information of the picture elements corresponding to the respective target pixels.

As the position of each picture element in the depth sensor is known, the position information of the feature component corresponding to the target pixels can be determined according to the positions of the picture elements output the target pixels and the depth information of the target pixels (that is, the distance information between the feature component and the picture elements output the target pixels).

At step S506, the position information of an item corresponding to each feature component is determined according to the position information of each feature component.

In an embodiment, an item placed correspondingly to each feature component is determined according to the position information of each feature component. That is, an item associated with each feature component is determined, and the position information of the item corresponding to each feature component is determined according to the pre-stored relative position information of the feature component with the corresponding item and the position information of each feature component.

In a specific implementation, an item corresponding to each feature component may be determined by referring to the following steps:

(1) The relative position relationships among the feature components are determined based on the position information of each feature component. For example, position information of six feature components is acquired in the above step S504, the six feature components include the feature component a, the feature component b, the feature component c, the feature component d, the feature component e, and the feature component f. According to the position information of the six feature components, it may be determined that the feature component a, the feature component b, and the feature component c are all located at a first height in the space, and are sequentially adjacent to each other from left to right, and it may also be determined that the feature component d, the feature component e, and the feature component f are all located at a second height in the space, and are sequentially adjacent to each other from left to right, wherein the first height is higher than the second height, that is, the feature component d, the feature component e, and the feature component f are located directly above the feature component a, the feature component b, and the feature component c in the space.

(2) The number of each feature component is determined based on the relative position relationships among the feature components and first entry stored in advance. The first entry includes relative position relationships among the feature components with the numbers.

For example, it is known that a rack includes two layers of shelves, each of which is provided with three feature components. The first layer of shelf is provided with feature components F1-1, F1-2, and F1-3, and the second layer of shelf is provided with feature components F2-1, F2-2, and F2-3. The first entry records that F1-1, F1-2, and F1-3 are arranged sequentially adjacent to each other from left to right, F2-1, F2-2, and F2-3 are arranged sequentially adjacent to each other from left to right, and F2-1, F2-2, and F2-3 are located in the upper space of F1-1, F1-2, and F1-3. According to the relative position relationships among the feature components a-f, that is, the relative position relationships among F1-1~F2-3 are known, it can be determined that the feature component a is F1-1, the feature component b is F1-2, the feature component c is F1-3, the feature component d is F2-1, the feature component e is F2-2, and the feature component f is F2-3, accordingly, the number of each feature component identified from the sensing map may be determined. Each feature component is located at a different position and has a unique number. That is, the processing device knows in advance that how many shelves are there on the rack, and how many feature components are arranged on each of the shelves sequentially from left to right (that is, the relative positional relationships among the feature components are known). The number of each feature component can be determined according to the actually sensed relative position relationships among the feature components. In this way, although the position of each feature component may deviate, as the relative position relationships among the various feature components, the processing device can still determine the identity (i.e., the number) of each feature component according to the actual position of each feature component.

(3) An item corresponding to the each feature component is determined according to the number of each feature component and a second entry stored in advance. The correspondence relationship of a numbered feature component and an item is stored in the second entry.

For example, in the second entry, F1-1 corresponds to the item SKU1-1, F1-2 corresponds to the item SKU1-2, F1-3 corresponds to the item SKU1-3, F2-1 corresponds to the item SKU2-1, F2-2 corresponds to the items SKU2-2, and F2-3 corresponds to the item SKU2-3. Therefore, the item type corresponding to each feature component can be determined according to the second entry. In the rack, the feature components are associated with the positions of the respective items, e.g., the items are placed uniformly at the right side of the respective feature components and adjacent to the respective feature components. Of course, the items can be uniformly placed in the rear areas of the respective feature components, and the arrangement relationship between the items and the respective feature components is not limited herein, and can be flexibly set in practical applications.

After each feature component and the corresponding item are determined, the position information of the item corresponding to each feature component may be further determined according to the relative position relationship between each feature component and the corresponding item stored in advance and the position information of each feature component. For example, it has been determined that the feature component F1-1 corresponds to the SKU1-1, the position of the feature component F1-1 has been sensed by the depth sensor, and further based on the relative position relationship between F1-1 and SKU1-1 (for example, F1-1 is place at the right side of SKU1-1, and the distance between F1-1 and SKU1-1 is within 1 cm), the position information of SKU1-1 can be determined.

The above-mentioned method for determining the position of an item provided by this embodiment can first determine the position of the feature component, thereby, determine the position of the item placed corresponding to the feature component. Therefore, even if the position of the item deviates, manual calibration is not required. The processing device determines the position of an item corresponding to a feature component by identifying the feature component which has a specific reflectance or which is a light source having a specific wavelength. Therefore, cumbersome manual calibration is omitted and the cost of labor is saved.

In addition, in order to obtain the accurate item position information, the position information of the depth sensor should be accurate. Therefore, the above steps provided by the embodiment may further include a step of calibrating the position of the depth sensor, which can be used for an initial installation calibration of the depth sensor, and also may be used for recalibrating the depth sensor when the position of the depth sensor deviates due to vibration, external force impact or other reasons. For the detailed calibration method, the following steps can be performed:

Step 1, current position information of the depth sensor can be determined according to the known position information and depth information of the feature component.

In practical applications, position information and depth information of at least two known feature components may be acquired. Then, according to the position information and the depth information of the at least two known feature components, current position information of the depth sensor may be determined by using a triangulation algorithm. For example, m (m≥2) feature components are fixedly disposed on the bottom layer of the rack, and the feature components may have characteristics of infrared high reflectance and infrared low reflectance characteristics, or the feature components may be an infrared light source. The position information of the two known feature components is predetermined, the depth information can be acquired by the depth sensor located at the current position, and the current position of the depth sensor can be derived by triangulation.

Step 2, it is determined whether the current position information of the depth sensor is consistent with preset reference position information. The reference position information is also the preset installation position of the depth sensor. Assume that the depth sensor has a field of view FOV1 of 90 degrees at the reference position for covering the entire surface of the rack, and a FOV2 of 30 degrees for covering the front space of the entire rack. If the FOV1 of the depth sensor at the current position is 85 degrees and the FOV2 is 30 degrees, it can be understood that the FOV1 of the current position is 5 degrees away from the FOV1 of the reference position, and the whole rack is not completely located in the sensing space of the depth sensor at the current position, so that some of the items or feature components on the rack cannot be sensed by the depth sensor.

During the actual determination process, known feature components can be disposed on the rack (hereinafter, the bottom feature points are taken as an example), and by using the sensing map collected by the depth sensor, pixels corresponding to the bottom feature points can be determined in the sensing map, that is, the actual positions of the picture elements pixel sensing the bottom feature points can be determined. If the actual positions of the picture elements are not consistent with the theoretical positions of the picture elements, it can be determined that the current position information of the depth sensor is inconsistent with the preset reference position information. Wherein, the theoretical positions of the picture elements are positions of the corresponding picture elements sensing the known feature components of the depth sensor located at the reference position.

Step 3, If not, the position of the depth sensor is adjusted, so that the adjusted position information of the depth sensor is consistent with the reference position information.

In an embodiment, a motor can be disposed on the depth sensor. The processing device can determine the moving direction and the moving distance of the motor according to the current position information and the reference position information of the depth sensor, and then control the motor to move according to the moving direction and the moving distance to drive the depth sensor to reach the reference position from the current position.

For ease of understanding, the manner of installing the motor is further exemplified: in an embodiment, a supporting device for supporting the motor and the depth sensor is fixedly installed on the rack, and the motor and the depth sensor can be regarded as a whole, the motor can directly drive the depth sensor to move when the motor moves, so as to change the position of the depth sensor. In another embodiment, the motor can be first installed on the rack, and the motor is connected to the depth sensor through the supporting device, and the motor can adjust the position of the supporting device, and drive the depth sensor to move via the supporting device to change the position of the depth sensor. Of course, the above are only two installation examples. In practical applications, it is not limited to the above-mentioned two methods, and any manner of installation can be adopted as long as the motor can drive the depth sensor to move and change the position of the depth sensor.

For example, a three-axis servo is provided on the depth sensor. When the depth sensor is position-calibrated, the actual positions of the picture elements on the depth sensor that are corresponding to the bottom feature points are first measured. If the actual positions of the picture elements and the theoretical positions of the picture elements are different, the processing device may control the three-axis servo to move in a direction that reduces the difference until the difference between the actual positions and the theoretical positions is within a predetermined range.

In the above manner, the installation position of the depth sensor can be calibrated, which further improves the accuracy and reliability of the determination result of the positions of the items.

In summary, in the method for determining the position of the item as provided by the embodiment, the processing device senses the feature component having specific reflection intensity via the depth sensor, and can determine the position of each feature component, thereby determine the position of the item that is corresponding to feature component. Even if the position of the item slightly deviates, the processing device can still determine the position of the item based on the position of the feature component without manual recalibration, which saves labor cost.

Figure 6:
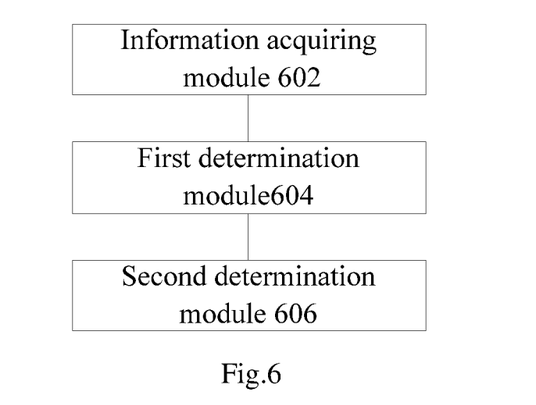
FIG. 6 shows a schematic structural diagram of an apparatus for determining a position of an item according to an embodiment of the present disclosure.

An apparatus for determining a position of an item is provided, which is corresponding to the method for determining the position of the item provided by the foregoing embodiment. The apparatus is disposed in the processing device end, and the processing device is connected to the depth sensor installed on the rack, and the rack is located in the sensing space of the depth sensor. The rack is also provided with multiple feature components, and the feature components have specific reflectance, or the feature components are light sources having a specific wavelength. Each item on the rack is corresponding to a feature component. Referring to the structural block diagram of the apparatus for determining the position of the item as shown in FIG. 6, the apparatus including:

Information acquiring module 602, for acquiring depth information and light intensity information collected by the depth sensor.

First determination module 604, for determining position information of each feature component according to the light intensity information and the depth information.

Second determination module 606, for determining the position information of an item corresponding to each feature component according to the position information of each feature component.

The above determination apparatus for determining the position of an item provided by this embodiment can first determine the position of the feature component, and the feature component has a specific reflectance or which is a light source having a specific wavelength, thereby, the position of the item placed corresponding to the feature component can be determined without manual measurement and calibration. Therefore, cumbersome manual calibration is omitted and the cost of labor is saved.

In an embodiment, the above information acquiring module 602 includes:

A sensing map acquiring unit, for acquiring a sensing map collected by the depth sensor, wherein the sensing map includes multiple pixels, each pixel corresponds to depth information and light intensity information output by a picture element of the depth sensor; and an information extraction unit, for extracting the depth information and light intensity information corresponding to each pixel in the sensing map.

In an embodiment, the first determination module 604 includes a pixel identification unit and a component position determination unit, wherein:

The pixel identification unit identifies a target pixel from the sensing map according to the light intensity information of each pixel, wherein, the light intensity information of the target pixel matches specific reflection intensity, or the light intensity information of the target pixel matches the specific emission intensity. In specific implementations, the pixel identification unit further selects a pixel having a difference between its light emission intensity and the specific reflection intensity within a first preset threshold range from the sensing map according to the light intensity information of each pixel, or selects a pixel having a difference between its emission intensity and the specific emission intensity within a second preset threshold range from the sensing map, and then determining the selected pixels as the target pixels.

The component position determination unit determines the position information of the feature component corresponding to the respective target pixels based on the depth information of each target pixel. In specific implementations, the component position determination unit further determines the position information of the feature component corresponding to the target pixels according to the depth information of each target pixel and the pre-stored position information of the picture elements corresponding to the respective target pixels.

In one embodiment, the above second determination module 606 includes an item determination unit and an item position determination unit, wherein:

The item position determination unit determines an item associated with each feature component according to the position information of each feature component. In specific implementations, the item position determination unit further determines the relative position relationships among the feature components based on the position information of each feature component; determines the number of each feature component based on the relative position relationships among the feature components and a first entry stored in advance. Wherein the first entry includes relative position relationships among the feature components with the numbers. The item position determination unit further determines an item corresponding to the each feature component according to the number of each feature component and a second entry stored in advance, wherein the second entry stores correspondence relationship of a numbered feature component and an item.

The item position determination unit determines the position information of the item corresponding to each feature component according to the relative position relationship between each feature component and the corresponding item stored in advance and the position information of each feature component.

In addition, the above apparatus according to the embodiment further includes:

a third determination unit that determines current position information of the depth sensor according to known position information and depth information. Moreover, the third determination unit acquires position information and depth information of at least two known feature components, and determines current position information of the depth sensor by using a triangulation algorithm according to the position information and the depth information of the at least two known feature components;

a determination unit that determines whether the current position information of the depth sensor is consistent with preset reference position information;

a position adjustment module that adjusts the position of the depth sensor so that the adjusted position information of the depth sensor is consistent with the reference position information when the determination result from the determination unit is negative.

In specific implementation, a motor can be disposed on the depth sensor. The position adjustment module further determines the moving direction and the moving distance of the motor according to the current position information and the reference position information of the depth sensor, and then controls the motor to move according to the moving direction and the moving distance to drive the depth sensor to reach the reference position from the current position.

In practical application, the feature component is made of a material having a specific reflectance with respect to the wavelength of the light source of the depth sensor, or the feature component is a light source with a wavelength that is consistent with the wavelength of the light source of the depth sensor.

In an embodiment, the above depth sensor is infrared depth sensor. The above specific reflectance may be higher than a first preset reflectance or lower than a second preset reflectance. That is, the feature component having a specific reflection intensity may be a component made of a material with a reflectance higher than a first preset infrared reflectance, or a component made of a material with a reflectance lower than a second preset infrared reflectance, or an infrared light source with a wavelength that is consistent with the that of the light source of the depth sensor.

The apparatus according to the embodiment, the implementation principle and the technical effects are the same with the above-mentioned embodiments, and other parts of the apparatus that are not mentioned here can be referred to the corresponding description of the above-mentioned embodiments.

Figure 7:
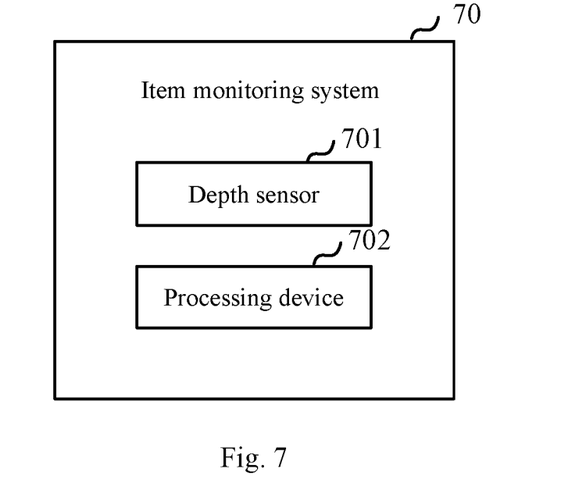
FIG. 7 shows a schematic diagram of an item monitoring system according to an embodiment of the present disclosure.

As shown in FIG. 7, an item monitoring system 70 is provided. The item monitoring system 70 includes a depth sensor 701 and a processing device 702; the depth sensor 701 collects sensing information and light intensity information; the processing device 702 stores computer programs, and the computer programs, when being executed by the processing device, implement a method according to above-mentioned embodiment.

The skilled in the art should understand that, for the purpose of convenience and concise, the detailed process of the system can be referred to the corresponding processes of the above-mentioned embodiments, the details are omitted herein.

Figure 8:
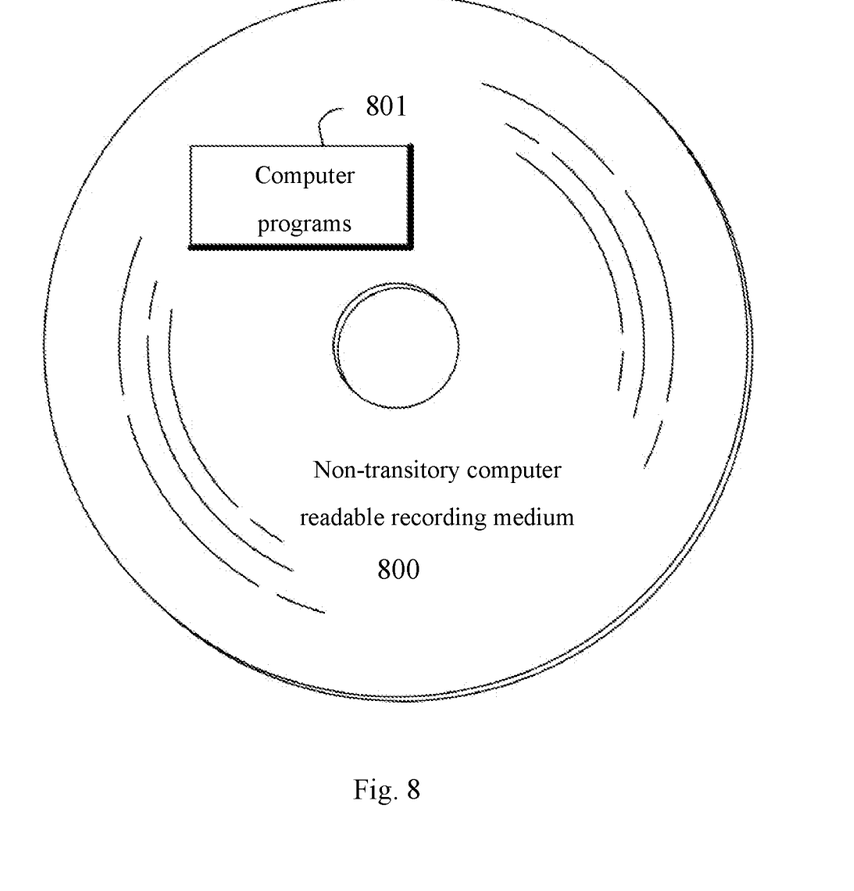
FIG. 8 shows a schematic diagram of a non-transitory computer readable recording medium according to an embodiment of the present disclosure.

Furthermore, as shown in FIG. 8, the embodiment further provides a non-transitory computer readable storage medium 800, where the non-transitory computer readable storage medium 800 stores computer programs 801, and when the computer programs 801 being executed by the processor, perform the steps of the method provided in the foregoing embodiment.

A computer program product for a method, an apparatus, and a system for determining a position of an item according to an embodiment of the present disclosure includes a computer readable storage medium storing program code, the program code includes instructions for executing the method of the foregoing method embodiments. The specific implementation of the method may be referred to the method embodiment, and details are not described herein again.

Although exemplary embodiments have been described by referring to the accompany figures, it shall be understood that the above exemplary embodiments are just for illustration, but do not intend to limit the scope of the present disclosure thereto. Those ordinary skilled in the art can make various modifications and amendments, without departing from the scope and spirit of the present disclosure. All these modification and amendments intend to be included within the scope of the disclosure as claimed in the Claims.

Those ordinary skilled in the art can realize that by combining with the units and algorithm steps of respective examples described in the embodiments of the present disclosure, it is capable of being implemented by a combination of an electronic hardware, or a computer software and an electronic hardware. Whether these functions are implemented in a hardware manner or in a software manner depends on specific application and design constraints of the technical solutions. Those professional skilled in the art can use different methods for each specific application to implement the functions described above, but such implementation shall not be regarded as going beyond the scope of the present disclosure.

In the several embodiments provided by the present disclosure, it shall be understood that the disclosed device and method can be realized by other means. For example, the device embodiments described above are just for illustration; for example, division of the user is just a logical function division, and there may be additional manners of division in the actual implementation, for example, a plurality of units or components can be combined or can be integrated into another device, or some features can be omitted, or not performed.

In the description provided herein, a large amount of specific details are described. However, it shall be understood that the embodiments of the present disclosure can be realized without these specific details. In some embodiments, commonly known methods, structures and techniques are not presented in detail, for the purpose of not blurring the understanding of the present description.

Likewise, it shall be understood that in order to simplify the present disclosure and help to understand one or more of respective aspects, in the description of exemplary embodiments of the present disclosure, respective features of the present disclosure are grouped together into a single embodiment, figure or description of the single embodiment and the figure at some times. However, the method of the present disclosure shall not be explained to reflect the following intension: the present disclosure sought for protection shall claim more features than the features recited explicitly in each claim. Rather, as reflected in the corresponding Claims, its inventive point lies in that the corresponding technical problem can be solved by using features less than all the features of a certain single embodiment in the present disclosure. Therefore, the claims keeping to a specific implementation are thus incorporated explicitly into the specific implementation, wherein each claim per se is taken as a single embodiment of the present disclosure.

Those skilled in the art can understand that except mutual exclusiveness among the features, any combination can be adopted to combine all features disclosed in the present description (including the accompanying claims, abstract and figures) or all processors or units of any method or device disclosed in such way. Unless otherwise stated explicitly, each feature disclosed in the present description (including the accompanying claims, abstract and figures) can be replaced with an alternative feature that provides same, equivalent or similar purpose.

In addition, those skilled in the art are able to understand that although some embodiments described herein comprise some features but not other features included in other embodiments, but combination of features of different embodiments means to fall into the scope of the present disclosure but form different embodiments. For example, in the Claims, any one of embodiments sought for protection can be used in a manner of any combination.

Respective component embodiments of the present disclosure can be realized by a hardware, or can be realized by a software module ran on one or more processors, or can be realized by a combination of the above. Those skilled in the art shall understand that some or all functions of some modules of the embodiments of the present disclosure can be realized in practice by using a microprocessor or a digital signal processor (DSP). The present disclosure can be further realized as a part or all of apparatus programs (for example, computer program and computer program product) used for performing the method herein. Such program for realizing the present disclosure can be stored on a computer readable medium, or can have a form of one or more signals. Such signal can be downloaded from Internet website, or provided on a carrier signal, or provided in any other forms.

It shall be noted that the above embodiments are used to describe the present disclosure but not limit the present disclosure, and those skilled in the art can design alternative embodiments without departing from the scope of the Claims attached herein. In the claims, any reference marks inside the parentheses shall not form a limitation to the claims. The word "include" and "comprise" does not exclude that there are elements or steps not listed in the claims. The word "a" or "one" before an element does not exclude that there are a plurality of these elements. The present disclosure can be realized by means of a hardware including several different elements and by means of appropriate programmable computer. In the unit claims having recited several devices, several of these devices can be specifically reflected by a same hardware. The user of first, second and second do not indicate any sequence. These words can be explained as names.

The above descriptions are just specific implementations of the present disclosure or are just specification for the specific implementations of the present disclosure. The protection scope of the present disclosure is not limited thereto. Any alternation or replacement that can be conceived by those skilled in the art who are familiar with the technical field within the technical scope of the present disclosure shall fall into the protection scope of the present disclosure. The protection scope of the present disclosure shall be subject to the protection scope of the claims.

What is claimed is:

1. A method for determining a position of an item, wherein the method is applied to a processing device, the processing device is connected to a depth sensor installed on a rack, the rack is located in a sensing space of the depth sensor, the rack is provided with a plurality of feature components, wherein the feature components have specific reflectance, or the feature components are light sources with specific wavelength, each kind of item on the rack is placed corresponding to a feature component, wherein the method comprises:

acquiring depth information and light intensity information collected by the depth sensor;

determining position information of each feature component according to the light intensity information and the depth information; and determining the position information of an item placed corresponding to each feature component according to the position information of each feature component, wherein the step of acquiring depth information and light intensity information collected by the depth sensor, comprises:

acquiring a sensing map collected by the depth sensor, wherein the sensing map comprises a plurality of pixels, each pixel corresponds to depth information and light intensity information output by a picture element of the depth sensor;

extracting the depth information and light intensity information corresponding to each pixel in the sensing map.

2. The method according to claim 1, wherein the step of determining position information of each feature component according to the light intensity information and the depth information, comprises:

identifying a target pixel from the sensing map according to the light intensity information of each pixel, wherein the light intensity information of the target pixel matches a specific reflection intensity or the light intensity information of the target pixel matches a specific emission intensity, and wherein the specific reflection intensity is related to a specific reflectance and the specific emission intensity is related to the specific wavelength; and determining the position information of the feature component corresponding to each target pixel according to the depth information of each target pixel.

3. The method according to claim 2, wherein the step of identifying a target pixel from the sensing map according to the light intensity information of each pixel, comprises:

selecting a pixel having a difference between its light emission intensity and the specific reflection intensity within a first preset threshold range from the sensing map according to the light intensity information of each pixel, or selecting a pixel having a difference between its emission intensity and the specific emission intensity within a second preset threshold range from the sensing map; and determining the selected pixels as the target pixels.

4. The method according to claim 2, wherein the step of determining the position information of the feature component corresponding to each target pixel according to the depth information of each target pixel, comprises:

determining the position information of the feature component corresponding to the target pixels according to the depth information of each target pixel and the pre-stored position information of the picture elements corresponding to the respective target pixels.

5. The method according to claim 1, wherein the step of determining the position information of an item placed corresponding to each feature component according to the position information of each feature component, comprises:

determining an item placed corresponding to each feature component according to the position information of each feature component;

determining the position information of the item corresponding to each feature component according to pre-stored relative position relationships among the feature components and corresponding items.

6. The method according to claim 5, wherein the step of determining an item placed corresponding to each feature component according to the position information of each feature component, comprises:

determining the relative position relationships among the feature components based on the position information of each feature component;

determining the number of each feature component based on the relative position relationships among the feature components and a first entry stored in advance, wherein the first entry includes relative position relationships among the feature components with the numbers; and determining an item corresponding to the each feature component according to the number of each feature component and a second entry stored in advance, wherein the second entry stores correspondence relationship of a numbered feature component and an item.

7. The method according to claim 1, wherein the method further comprises:

determining current position information of the depth sensor according to known position information and depth information;

determining whether the current position information of the depth sensor is consistent with preset reference position information; and if the current position information of the depth sensor is not consistent with the preset reference position information, adjusting the position of the depth sensor so that the adjusted position information of the depth sensor is consistent with the reference position information.

8. The method according to claim 7, wherein the step of determining current position information of the depth sensor according to known position information and depth information, comprises:

acquiring position information and depth information of at least two known feature components; and determining current position information of the depth sensor by using a triangulation algorithm according to the position information and the depth information of the at least two known feature components.

9. The method according to claim 8, wherein the depth sensor is provided with a motor, and the step of adjusting the position of the depth sensor comprises:
determining the moving direction and the moving distance of the motor according to the current position information and the reference position information of the depth sensor; and
controlling the motor to move according to the moving direction and the moving distance to drive the depth sensor to reach the reference position from the current position.

10. The method according to claim 1, wherein the feature components are made of materials having specific reflectance with respect to the wavelength of the light source of the depth sensor, or the feature components are light sources with a wavelength that is consistent with the wavelength of the light source of the depth sensor.

11. The method according to claim 1, wherein the depth sensor is an infrared depth sensor, and the specific reflectance is higher than a first preset reflectance or lower than a second preset reflectance.

12. A non-transitory computer readable recording medium, wherein computer programs are stored in the non-transitory computer readable recording medium, wherein the computer programs, when being executed by the processing device, performs a method according to claim 1.

13. An item monitoring system, comprising:
a depth sensor; and
a processing device,
the depth sensor for collecting sensing information and light intensity information;
the processing device stores computer programs, the computer programs, when being executed by the processing device, performs a method for determining a position of an item, the processing device is connected to a depth sensor installed on a rack, the rack is located in a sensing space of the depth sensor, the rack is provided with a plurality of feature components, wherein the feature components have specific reflectance, or the feature components are light sources with specific wavelength, each kind of item on the rack is placed corresponding to a feature component,
the method comprises:
acquiring depth information and light intensity information collected by the depth sensor;
determining position information of each feature component according to the light intensity information and the depth information; and
determining the position information of an item placed corresponding to each feature component according to the position information of each feature component,
wherein when the computer programs being executed by the processing device, the step of acquiring depth information and light intensity information collected by the depth sensor, comprises:
acquiring a sensing map collected by the depth sensor, wherein the sensing map comprises a plurality of pixels, each pixel corresponds to depth information and light intensity information output by a picture element of the depth sensor;
extracting the depth information and light intensity information corresponding to each pixel in the sensing map.

14. The item monitoring system according to claim 13, wherein when the computer programs being executed by the processing device, the step of determining position information of each feature component according to the light intensity information and the depth information, comprises:
identifying a target pixel from the sensing map according to the light intensity information of each pixel, wherein the light intensity information of the target pixel matches a specific reflection intensity or the light intensity information of the target pixel matches a specific emission intensity, and wherein the specific reflection intensity is related to the specific reflectance and the specific emission intensity is related to the specific wavelength; and
determining the position information of the feature component corresponding to each target pixel according to the depth information of each target pixel.

15. The item monitoring system according to claim 14, wherein when the computer programs being executed by the processing device, the step of identifying a target pixel from the sensing map according to the light intensity information of each pixel, comprises:
selecting a pixel having a difference between its light emission intensity and the specific reflection intensity within a first preset threshold range from the sensing map according to the light intensity information of each pixel, or selecting a pixel having a difference between its emission intensity and the specific emission intensity within a second preset threshold range from the sensing map; and
determining the selected pixels as the target pixels.

16. The item monitoring system according to claim 14, wherein when the computer programs being executed by the processing device, the step of determining the position information of the feature component corresponding to each target pixel according to the depth information of each target pixel, comprises:
determining the position information of the feature component corresponding to the target pixels according to the depth information of each target pixel and the pre-stored position information of the picture elements corresponding to the respective target pixels.

17. The item monitoring system according to claim 13, wherein when the computer programs being executed by the processing device, the step of determining the position information of an item placed corresponding to each feature component according to the position information of each feature component, comprises:
determining an item placed corresponding to each feature component according to the position information of each feature component; and
determining the position information of the item corresponding to each feature component according to pre-stored relative position relationships among the feature components and corresponding items.

18. The item monitoring system according to claim 17, wherein when the computer programs being executed by the processing device, the step of determining an item placed corresponding to each feature component according to the position information of each feature component, comprises:
determining the relative position relationships among the feature components based on the position information of each feature component;

determining the number of each feature component based on the relative position relationships among the feature components and a first entry stored in advance, wherein the first entry includes relative position relationships among the feature components with the numbers; and determining an item corresponding to the each feature component according to the number of each feature component and a second entry stored in advance, wherein the second entry stores correspondence relationship of a numbered feature component and an item.

* * * * *